United States Patent Office 3,682,875
Patented Aug. 8, 1972

3,682,875
STABILIZED ANAEROBIC SEALANT
COMPOSITION
Denis Joseph O'Sullivan and David John Stamper, Dublin, Ireland, assignors to Loctite (Ireland) Limited, Dublin, Ireland
No Drawing. Filed Sept. 22, 1970, Ser. No. 74,517
Int. Cl. C08f 3/64, 3/66, 15/16
U.S. Cl. 260—89.5 R          14 Claims

ABSTRACT OF THE DISCLOSURE

Anaerobic compositions composed of polymerizable acrylate ester monomers and peroxy polymerization initiators are stabilized by the incorporation therein of a stable nitroxide free radical.

BACKGROUND OF THE INVENTION

Anaerobic sealants and adhesives are precatalyzed polymerizable compositions, the cure of which is inhibited by oxygen. While stored in partially empty containers, which preferably are made of air permeable plastics such as low density polyethylene, sufficient oxygen continuously contacts the anaerobic composition to retain it in its uncured, liquid state. In use, the composition is placed between surfaces which are to be sealed or bonded. When these surfaces effectively exclude atmospheric oxygen, polymerization (cure) of the composition will commence within a relatively short period of time, generally a few minutes or a few hours.

Anaerobic compositions generally are composed of polymerizable acrylate ester monomers and peroxy polymerization initiators therefor, and the most desirable commercial formulations also contain "latent polymerization accelerators," such as amines and sulfimides. "Latent polymerization accelerators" do not serve to initiate cure, but rather to accelerate the polymerization reaction once commenced.

Problems with the stability of anaerobic compositions frequently can be created, for example by the entry of contaminants during or subsequent to manufacture, or by subjection to temperature changes and ultraviolet radiation during storage. Any of these conditions can supplement or increase the effectiveness of the polymerization initiator contained within the anaerobic composition, and hence generate stability problems prior to use.

To prevent this spurious and undesirable polymerization caused by outside influences, it has been common to include within the anaerobic composition small amounts of an inhibitor of free radical polymerization. Large numbers of such materials are known in the polymerization art, but very few have been found to be particularly effective in anaerobic compositions. Most of these inhibitors conventionally are used in conjunction with stored monomers, but they are not sufficiently effective to be used when the monomers are catalyzed with a room temperature curing agent, as is true in the case of anaerobic compositions.

The preponderance of anaerobic compositions to date have utilized quinone type inhibitors, and it would be a major improvement in the art if alternative inhibitors were to be found whch were comparable or superior to the quinones when used as inhibitors in anaerobic compositions.

This invention concerns anaerobic compositions which contain as free radical polymerization inhibitors at least one stable nitroxide free radical. As used herein, "stable nitroxide free radical" refers to nitroxide free radicals which show no appreciable decomposition at room temperature, or which have a sufficiently low rate of deterioration or decomposition in the anaerobic composition that its effectiveness as an inhibitor of free radical polymerization will remain over a reasonable period of time, such as from about three to six months or longer. To achieve utility in this regard, the nitroxide free radical should possess a half life of one month or longer in the anaerobic composition.

This invention also involves improved anaerobic compositions achieved by adding thereto a stable nitroxide free radical of the type described above, and the method of improving anaerobic compositions by so doing.

The most dramatic benefits of the invention disclosed herein are seen in anaerobic compositions which contain latent accelerators of polymerization, which have been mentioned above and which will be described in detail hereinafter. It is in compositions of this type that the greatest stability problems are encountered, and hence the maximum benefits of the invention disclosed herein are realized.

DESCRIPTION OF THE INVENTION
AND ITS PREFERRED EMBODIMENTS

As indicated above, any nitroxide free radical having the essential stability against decomposition in the anaerobic composition can be utilized. It is preferred that the half life of the nitroxide free radical is at least about two months in the anaerobic composition, and most preferably is at least about six months. With the above described stabilities against decomposition, the nitroxide free radical can be used effectively to prevent spurious polymerization in anaerobic compositions over reasonable periods of time, i.e., the normal period of time required between manufacture and use. This is particularly true in the preferred ranges described above, since shelf stability substantially in excess of a year can be obtained.

A thorough discussion of nitroxide free radicals, and particularly those which can be prepared in relatively stable form can be found in Forrester, A. R., et al., "Organic Chemistry of Stable Free Radicals," Academic Press, London and New York (1968), as well as in, for example, British Pats. 1,127,127, published Sept. 11, 1968, and 1,145,470, published Mar. 12, 1969. Basically, the nitroxide free radical is a compound containing the group >N—O. The stability of the free radical is determined primarily by the nature of the two nitrogen substituents.

As a general rule, in the stable nitroxide free radicals used in the compositions herein, each nitrogen substituent is an organic radical containing up to about 20 or more carbon atoms. In the preponderance of stable nitroxide free radicals, each substituent is an alkyl or aryl hydrocarbon group. The above definition is intended to include all substituted alkyl or aryl groups wherein the substituents do not adversely affect the nitroxide free radical for its intended purpose herein.

The preferred stable nitroxide free radicals are those having the following general formula:

$R^1$ and $R^2$ each being organic radicals wherein the atoms adjacent the nitrogen atom are carbon, and said carbon atoms contain no hydrogen substituents. Where some relatively stable nitroxide free radicals have been reported recently wherein one of the carbon atoms in the alpha position relative to the nitrogen atom did contain a hydrogen atom, it is believed that in nearly all cases the presence of an alpha hydrogen will lead to disproportionation reactions between nitroxide free radical molecules, and hence relatively rapid decomposition. Substituents on the alpha carbon can be, for example, $C_1$–$C_6$ alkyl or alkenyl, halogen, $C_2$–$C_6$ aryl or thioaryl, cyanide, —$C(O)NH_2$, thiophenyl and —$C(O)OR^3$ where $R^3$ is a $C_1$–$C_{12}$ alkyl or aryl.

The most common stable nitroxide free radicals are those wherein $R^1$ and $R^2$ together with the nitrogen atom of the nitroxide group, form a heterocyclic ring (e.g.,

or each are selected from the group consisting of tertiary alkyl and aryl groups, each of $R^1$ and $R^2$ containing up to about 20 carbon atoms, and most preferably up to about 12 carbon atoms. When both of $R^1$ and $R^2$ are tertiary alkyl, the most highly preferred compound is ditertiary butyl nitroxide. It generally is preferable, when either or both $R^1$ and $R^2$ are aryl groups, that the para position of each aryl group be substituted since the presence of an accessible hydrogen atom in a para position of the aryl group has been found to be a common source of instability of the nitroxide free radical. When the aryl group is not para substituted, the instability can be reduced by (a) dimeta substitution or (b) mono- or diortho substitution. In all cases, the above substituents can be any substituent which serves to stabilize the nitroxide free radical; however, alkyl, alkoxy and nitro groups have been reported as suitable.

The following are typical examples of stable nitroxide free radicals which can be used in the compositions of the present invention: di-t-butyl nitroxide; 2,2,6,6-tetramethylpiperidine - 1 - oxyl; 4,4' - dimethoxydiphenyl nitroxide; 2,2',6,6'-tetramethoxydiphenyl nitroxide; t-butyl-4 - nitrophenyl nitroxide; t - butyl - 3,5 - dimethylphenyl nitroxide; and t-butyl-2,6-dimethoxyphenyl nitroxide.

The amount of stable nitroxide free radical used can vary within wide limits, depending upon the specific anaerobic composition, the specific nitroxide chosen, and the length of time for which the composition is to retain its stability. While as little as 1 part per million by weight, and as much as about one percent by weight can be used, a reasonable general range is between about 10 and about 1000 parts per million by weight of the anaerobic composition. Preferably, the range is between about 25 and about 500 parts per million.

The most desirable monomers for use in anaerobic compositions are polymerizable acrylate esters. When used in the compositions of this invention, preferably at least a portion of the acrylate monomer is a di- or other polyacrylate ester. These poly-functional monomers produce cross-linked polymers, which serve as more effective and more durable sealants and adhesives.

The polyacrylate esters may be represented by the formula:

(1) 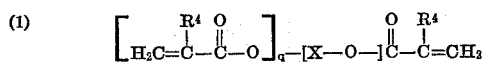

wherein $R^4$ is a radical selected from the group consisting of hydrogen, halogen and alkyl of from 1 to about 4 carbon atoms; $q$ is an integer equal to at least 1, and preferably equal to from 1 to about 4; and X is an organic radical containing at least two carbon atoms and having a total bonding capacity of $q$ plus 1. For example, X can be an organic radical of the formula:

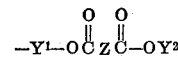

wherein each of $Y^1$ and $Y^2$ is a hydrocarbon group containing at least 2 carbon atoms, and preferably from 2 to about 10 carbon atoms, and Z is a hydrocarbon group containing at least 1 carbon atom, and preferably from 2 to about 20 carbon atoms. Another class of useful polyacrylate ester monomers are the isocyanate-monoacrylate reaction products described in U.S. Pat. 3,425,988 to Toback and Gorman, issued Feb. 4, 1969.

The most highly preferred acrylate esters which can be used in the compositions disclosed herein are polyacrylate esters which have the following general formula:

(2) 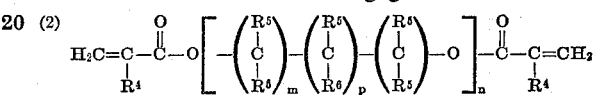

wherein $R^4$ is as defined above, $R^5$ represents a radical selected from the group consisting of hydrogen, lower alkyl of from 1 to about 4 carbon atoms, hydroxy alkyl of from 1 to about 4 carbon atoms, and

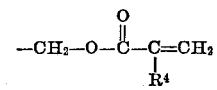

$R^6$ is a radical selected from the group consisting of hydrogen, hydroxyl, and

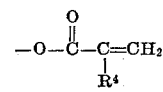

$m$ is an integer equal to at least 1, e.g., from 1 to about 15 or higher, and preferably from 1 to about 8 inclusive; $n$ is an integer equal to at least 1, e.g., 1 to about 40 or more, and preferably between about 2 and about 10; and $p$ is one of the following: 0, 1.

The polymerizable polyacrylate esters utilized in accordance with the invention and corresponding to the above general formula are exemplified by, but not restricted to, the following materials; di-, tri- and tetraethyleneglycol dimethacrylate; dipropyleneglycol dimethacrylate; polyethyleneglycol dimethacrylate; polypropyleneglycol dimethacrylate; di(pentamethyleneglycol) dimethacrylate; tetraethyleneglycol diacrylate; tetraethylene glycol di(chloroacrylate); diglycerol diacrylate; diglycerol tetramethacrylate; tetramethylene dimethacrylate; ethylene dimethacrylate; butyleneglycol dimethacrylate; neopentylglycol diacrylate; and trimethylolpropane triacrylate.

While di- and other polyacrylate esters—and particularly the polyacrylate esters described in the preceding paragraphs—have been found particularly desirable, monofunctional acrylate esters (esters containing one acrylate group) also may be used. When dealing with monofunctional acrylate esters, it is preferable to use an ester which has a relatively polar alcoholic moiety. Such materials are less volatile than low molecular weight alkyl esters and, more important, the polar group tends to provide intermolecular attraction in the cured polymer, thus producing a more durable sealant or adhesive. Most preferably the polar group is selected from the group consisting of labile hydrogen, heterocyclic ring, hydroxy, amino, cyano, and halogen polar groups. Typical examples of compounds within this category are cyclohexylmethacrylate, tetrahydrofurfuryl methacrylate, hydroxyethyl acrylate, hydroxypropyl methacrylate, t-butylaminoethyl methacrylate, cyanoethylacrylate, and chloroethyl methacrylate.

As indicated above, the anaerobic compositions described herein additionally contain a peroxy initiator for the acrylate esters described above. While certain peroxides (such as dialkyl peroxides) have been disclosed as useful initiators in, e.g., United States Pats. 3,419,512 to Lees, issued Dec. 31, 1968 and 3,479,246 to Stapleton, issued Nov. 18, 1969, the hydroperoxides are highly superior and constitute a highly preferred embodiment of this invention.

The real benefit of the non-hydroperoxide initiators is as a co-initiator with the hydroperoxides to make the cure properties of the anaerobic composition more universal. When used, the peroxides can comprise from about 0.1 to about 15% by weight of the composition.

Hydrogen peroxide may be used, but the most desirable polymerization initiators are the organic hydroperoxides. Included within this definition are materials such as organic peroxides or organic peresters which decompose or hydrolyze to form organic hydroperoxides in situ. Examples of such peroxides and peresters are cyclohexyl hydroxycyclohexyl peroxide and t-butyl perbenzoate, respectively.

While the nature of the organic hydroperoxides is not critical to the broad concept of this invention, the general class of hydroperoxides can be represented by the formula $R^7OOH$, wherein $R^7$ generally is an organic radical containing up to about 18 carbon atoms, and preferably is a hydrocarbon group containing from about 3 to about 12 carbon atoms. Most preferably, the hydrocarbon group is alkyl, aryl or aralkyl. Naturally $R^4$ can contain any substituent or linkage, hydrocarbon or otherwise, which does not affect the hydroperoxide adversely for the purpose disclosed herein. Typical examples of such organic hydroperoxides are cumene hydroperoxide, tertiary butyl hydroperoxide, methylethylketone hydroperoxide, and hydroperoxides formed by oxygenation of various hydrocarbons such as methylbutene, cetane, and cyclohexene, and various ketones and ethers, including certain compounds represented by the general Formula 2 above. The organic hydroperoxide initiators which are used commonly comprise less than about 10 percent by weight of the combination of polymerizable monomer and initiator, since above that level adverse effects on the strength and durability of the cured composition may be experienced. Preferably the hydroperoxide initiator comprises from about 0.1 percent to about 5 percent by weight of the combination.

While the benefits of this invention are achievable in all anaerobic compositions in the form of increased stability, they are seen most clearly in anaerobic compositions which contain polymerization accelerators. As explained above, such accelerators should be incorporated in the composition to obtain rapid cure at the time of intended use. This avoids the need to add accelerators either to the anaerobic composition or the surfaces to be bonded, sealed, etc., at the time of use.

The most common of the polymerization accelerators suitable for incorporation in anaerobic composition are discussed below and the benefits of the invention are achievable with any of such accelerators. It should be noted, however, that large numbers of polymerization accelerators are known in the art, and the broad concept of this invention is intended to encompass any polymerization accelerator which can be incorporated in the anaerobic composition without destroying the essential characteristics of such composition.

Among the earliest of the polymerization accelerators used in anaerobic composition were amines. The most commonly used are tertiary amines such as tributylamine and triethylamine. Essentially the entire class of tertiary amines can be used in such compositions, and the class may be broadly represented by the formula: $NR^8R^9R^{10}$; wherein each of $R^8$, $R^9$ and $R^{10}$ is an organic radical, preferably a hydrocarbon group, containing up to about ten carbon atoms. Preferably, each of $R^8$, $R^9$ and $R^{10}$ is an alkyl, aryl or aralkyl group containing up to about 8 carbon atoms.

The N,N-dialkyl aryl amines are particularly effective tertiary amines. Typical amines within this class may be represented by the following general formula:

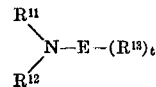

wherein E represents a carbocyclic aromatic nucleus selected from the group consisting of phenyl and naphthyl radicals; $R^{11}$ and $R^{12}$ are hydrocarbon groups containing up to about 10 carbon atoms, and preferably are lower alkyl radicals of 1 to 4 carbon atoms; $t$ is one of the following: 0, integer equal to from 1 to 5 inclusive; $R^{13}$ is a hydrocarbon group containing up to about 5 carbon atoms, and preferably is a member selected from the groups of lower alkyl and lower alkoxy radicals of 1 to 4 carbon atoms inclusive, provided that when an $R^{13}$ radical is in the ortho position, $t$ is greater than 1.

Certain secondary amines also can be used as accelerators, but care must be utilized in the selection of secondary amines since they are potent accelerators. They frequently can cause stability problems if used in too large an amount. The most desirable class of secondary amines has been found to be the class of heterocyclic secondary amines, particularly heterocyclic secondary amines containing up to about 20 carbon atoms. It also is preferred to use those amines wherein the heterocyclic ring is hydrogenated. Typical of such compounds are pyrrolidine, piperazine and 1,2,3,4-tetrahydroquinoline. Low levels of certain primary amines can be used, but rarely, if ever, can any advantage be shown over the other amines, previously described.

Another highly successful class of accelerators is the organic sulfimides, i.e., organic compounds which contain the group

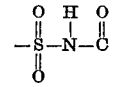

Because of the extreme effectiveness of the sulfimides as accelerators for anaerobic compositions, the use of the invention disclosed herein with anaerobic compositions containing organic sulfimides constitutes a highly preferred practice thereof. While the broad class of organic sulfimides can be used successfully, the sulfimides most commonly used can be represented by the formula

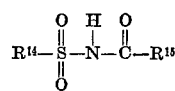

wherein each of $R^{14}$ and $R^{15}$ is an organic radical, preferably a hydrocarbon group, containing up to about ten carbon atoms, and preferably up to about six carbon atoms. Naturally, $R^{14}$ and $R^{15}$ can contain any linkage or substituent which does not adversely affect the sulfimide for its intended use in the anaerobic composition. Further, $R^{14}$ and $R^{15}$ can be united to bond the sulfimide group in a heterocyclic ring, or a polynuclear heterocyclic ring system. Of the organic sulfimides, benzoic sulfimide has been found to be the most preferable.

An even more highly preferred composition is that which contains a sulfimide, particularly benzoic sulfimide, in combination with either a heterocyclic secondary amine or a tertiary N,N-dialkyl aryl amine, both of which are described above. For an expanded discussion of this type of system, reference is made to United States Pat. 3,218,305 to Krieble, issued Nov. 16, 1965.

Other less active accelerators can be used in the compositions of this invention. Typical examples of such accelerators are imides such as succinimide and phthalimide and amides such as formamide.

Routine testing easily will determine the optimum amount of accelerator which can be incorporated in a given anaerobic composition. However, the following general guide lines may be used. With regard to imides, amides and tertiary amines, large amounts may be used if desired, up to about 8 percent by weight of the composition, or higher. However, little if any additional benefit is obtained above about 5 percent. Most preferably these tertiary amine accelerators are used at from about 1 percent to about 4 percent by weight of the anaerobic composition. The sulfimide and heterocyclic secondary amine accelerators generally are used at less than about 4 percent by weight of the anaerobic composition. In the special case where a sulfimide is used in combination with a heterocyclic secondary amine or an N,N-dialkyl arylamine, the total of the two accelerators preferably does not exceed about 5 percent by weight of the anaerobic composition, and either component does not exceed about 3 percent by weight.

Other ingredients also can be used if desired to impart commercially desirable properties to the composition. Typical examples of such ingredients are thickeners, plasticizers, dyes, adhesive agents and thixotropic agents. Such materials can be used in such combinations and proportions as is desired, provided they do not affect adversely the anaerobic nature of the composition. While exceptions may exist in some cases, these materials generally do not comprise more than about 50 percent by weight of the total composition, and preferably not more than about 20 percent by weight of the composition.

EXAMPLES

The following examples are given to demonstrate the preparation and use of compositions within the scope of the invention disclosed herein. The examples are not intended to limit the scope of the invention. Unless stated to the contrary, all ratios and percentages in these examples are expressed on a weight basis.

EXAMPLE I

An anaerobic composition was prepared by incorporating in polyethylene glycol dimethacrylate (approximate average molecular weight=330) approximately 4% by weight cumene hydroperoxide, 0.4% by weight benzoic sulfimide and 0.3% by weight N,N-dimethyl-p-toluidine. The composition then was split into three portions, the first of which was allowed to remain unchanged in composition (Anaerobic Composition I). To the second and third portions, respectively, were added 100 parts per million and 200 parts by weight of di-t-butyl nitroxide (Anaerobic Composition II and Anaerobic Composition III, respectively).

Samples of each of Anaerobic Compositions I–III, inclusive, then were compared in an accelerated aging test. In this test, a standard 10 cm. glass test tube, approximately half-filled with sample, is suspended in an 82° C. constant temperature bath. From this point, the length of time which transpires before the appearance of the first gelled matter in the test tube is used as an approximate indication of shelf stability. In this test, an approximate minimum time of 20 minutes is required.

The results were:

TABLE 1

| Anaerobic Composition | Gel time (minutes) |
|---|---|
| I | 5 |
| II | 21 |
| III | *30+ |

*In these examples, "30+" indicates the test was discontinued after 30 minutes.

Samples of Anaerobic Compositions I and III then were tested for anaerobic curing characteristics. In this test, several drops of the anaerobic composition in question are placed on the threads of a standard ⅜–24 steel bolt, and a mating nut is assembled over the treated thread area. After one hour at room temperature, the torque required to move the nut relative to the bolt is measured. In the tests of this example, the required torque for each of Anaerobic Compositions I and III was approximately 15 foot pounds.

EXAMPLE II

An anaerobic composition was prepared from the polyethyleneglycol dimethacrylate of Example I by adding thereto 7% by weight cumene hydroperoxide and 4% tributylamine, and the composition was divided into two portions. The first was left unchanged in composition (Anaerobic Composition IV). To the other portion was added 50 parts per million by weight di-t-butyl nitroxide (Anaerobic Composition V).

Samples of Anaerobic Compositions IV and V were then subjected to the accelerated aging test described in Example I. The sample of Anaerobic Composition IV had a gel time of 9 minutes, whereas the sample of Anaerobic Composition V had a gel time of 30+ minutes.

Samples of Anaerobic Compositions IV and V then were used in the anaerobic curing test of Example I, again using ⅜–24 steel nuts and bolts, but allowing cure to progress for 3 hours at room temperature. The required torques for Anaerobic Compositions IV and V, respectively, were approximately 8 and 11 foot pounds. This difference is not considered significant in this test.

EXAMPLE III

An anaeorobic composition was prepared by the addition of 5% by weight t-butyl hydroperoxide and 4% by weight tributylamine to a quantity of the polyethylene glycol dimethacrylate of Example I. This composition then was split into five portions, and samples of these portions were used to test the effect of the conventional stabilizer p-benzoquinone (Anaerobic Composition VII, VIII) on the gel time in the accelerated aging test of Example I, as compared to the effect of a nitroxide stabilizer of the present invention, viz di-t-butyl nitroxide (Anaerobic Compositions IX, X). The concentration used and the results obtained were:

TABLE 2

| Anaerobic Composition | Stabilizer | Concentration P.p.m. by wt. | Concentration Mole/liter | Gel time (min.) |
|---|---|---|---|---|
| VI | None | 0 | | 5 |
| VII | p-Benzoquinone | 50 | $4.9 \times 10^{-4}$ | 9 |
| VIII | do | 100 | $9.8 \times 10^{-4}$ | 19 |
| IX | di-t-Butyl nitroxide | 50 | $3.7 \times 10^{-4}$ | 27 |
| X | do | 100 | $7.4 \times 10^{-4}$ | 30+ |

Samples of Anaerobic Compositions VI and X then were used in the anaerobic curing test of Example I, using ⅜–24 steel nuts and bolts, and a cure time of three hours at room temperature. The required torques for Anaerobic Compositions VI and X, respectively, were approximately 10 and 11 foot pounds.

EXAMPLE IV

An anaerobic composition was prepared by adding 5% by volume cumene hydroperoxide to the polyethyleneglycol dimethacrylate of Example I. The composition was divided into two portions, the first remaining unchanged in composition (Anaerobic Composition XI). To the other portion was added 200 parts per million of the stable nitroxide 2,2,6,6 - tetramethylpiperidine-1-oxyl (Anaerobic Composition XII). In the accelerated aging test of Example I, a sample of Anaerobic Composition XI had a gel time of less than 10 minutes, whereas a sample of Anaerobic Composition XII had a gel time of 30+ minutes.

Samples of Anaerobic Compositions XI and XII then were used in the anaerobic curing test of Example I, above, using ⅜–24 steel nuts and bolts and a cure time of 20 hours at room temperature. The required torque for Anaerobic Composition XI was found to be about 12 foot pounds, and the Anaerobic Composition XII about 14 food pounds.

EXAMPLE V

This example illustrates the effectiveness of the nitroxides of the present invention in the presence of the prior art quinone inhibitors.

An anaerobic composition was prepared by adding 5% by weight cumene hydroperoxide, 0.4% by weight benzoic sulfimide and 0.3% by weight N,N-dimethyl-p-toluidine to the polyethyleneglycol dimethacrylate of Example I, above. This composition was divided into 3 portions, the first of which remained unchanged in composition (Anaerobic Composition XIII). To one of the remaining portions were added 200 parts per million by weight p-benzoquinone (Anaerobic Composition XIV); to the final portion were added 200 parts per million by weight p-benzoquinone (Anaerobic Composition XIV); to the final portion were added 200 parts per million by weight p-benzoquinone and 200 parts per million by weight 2,2,6,6 - tetramethylpiperidine-1-oxyl (Anaerobic Composition XV).

Samples of Anaerobic Compositions XIII, XIV and XV were used in the accelerated aging test of Example I, above, and samples of Anaerobic Compositions XIII and XV were used in the anaerobic curing test, also of Example I, using a one hour cure at a room temperature. The results were as follows:

TABLE 3

| Anaerobic Composition | Gel time (min.) | Removal torque (ft. lbs.) |
|---|---|---|
| XIII | 5 | 16 |
| XIV | 15 | |
| XV | 30+ | 13 |

EXAMPLE VI

An anaerobic curing composition was prepared by the addition of 5% by weight cumene hydroperoxide and 3% by weight triethylamine to the polyethyleneglycol dimethacrylate of Example I, above. The composition was divided into two portions, the first of which was left unchanged in composition (Anaerobic Composition XVI). To the other portion were added 200 parts per million di-p-anisyl nitroxide (4,4'-dimethoxydiphenyl nitroxide) (Anaerobic Composition XVII). Samples of Anaerobic Compositions XVI and XVII were used in the accelerated aging test, and a sample of Anaerobic Composition XVII was used in the anaerobic cure (6 hours at 25° C.) test, both described in Example I, above. The results were as follows:

TABLE 4

| Anaerobic Composition | Gel time (min.) | Removal torque (ft.-lbs.) |
|---|---|---|
| XVI | 12 | |
| XVII | 30+ | 14 |

We claim:

1. An anaerobic composition which comprises a polymerizable acrylate ester monomer, a peroxy polymerization initiator in an amount sufficient to polymerize said monomer in the substantial absence of oxygen, and from about 1 to about 10,000 parts per million by weight of said composition of a stable nitroxide free radical having the general formula

wherein $R^1$ and $R^2$, together with the nitrogen atom of the nitroxide group, forms a heterocyclic ring, or where each of $R^1$ and $R^2$, is selected from the group consisting of tertiary alkyl and aryl groups containing up to about 20 carbon atoms; and wherein each atom adjacent to the nitrogen atom contains no hydrogen substituents.

2. The anaerobic composition of claim 1 wherein the stable nitroxide free radical has a half life in the anaerobic composition of at least about two months.

3. The anaerobic composition of claim 1 wherein the stable nitroxide free radical has a half life in the anaerobic composition of at least about six months.

4. The composition of claim 2 wherein the peroxy polymerization initiator is an organic hydroperoxide comprising less than about 10 percent by weight of the composition.

5. The composition of claim 4 wherein the polymerizable acrylate ester monomer is selected from the group consisting of polyacrylate ester monomers and monoacrylate ester monomers wherein the alcoholic moiety of the ester contains a polar group selected from the group consisting of labile hydrogen, heterocyclic ring, hydroxy, amino, cyano, and halogen polar groups.

6. The anaerobic composition of claim 5 wherein the concentration of stable nitroxide free radical is between about 10 and about 1,000 parts per million by weight of the anaerobic composition.

7. The anaerobic composition of claim 6 wherein the stable nitroxide free radicals are selected from the group consisting of di-t-butyl nitroxide; 2,2,6,6-tetramethylpiperidine-1-oxyl; 4,4'-dimethoxydiphenyl nitroxide; 2,2',6,6'-tetramethoxydiphenyl nitroxide; t-butyl-4-nitrophenyl nitroxide; t-butyl-3,5-dimethylphenyl nitroxide; and t-butyl-2,6-dimethoxyphenyl nitroxide.

8. The composition of claim 6 wherein the stable nitroxide free radical is di-t-butyl nitroxide.

9. An anaerobic composition which comprises a polymerizable acrylate ester monomer, a hydroperoxy polymerization initiator in an amount sufficient to polymerize said monomer in the substantial absence of oxygen, and from about 10 to about 10,000 parts per million by weight of a stable nitroxide free radical having the general formula

wherein $R^1$ and $R^2$, together with the nitrogen atom of the nitroxide group, forms a heterocyclic ring, or where each of $R^1$ and $R^2$ is selected from the group consisting of tertiary alkyl and aryl groups containing up to about 20 carbon atoms; and wherein each atom adjacent to the nitrogen atom contains no hydrogen substituents.

10. The anaerobic composition of claim 9 wherein the polymerizable acrylate ester monomer is selected from the group consisting of polyacrylate ester monomers and monoacrylate esters wherein the alcoholic moiety of the ester contains a polar group selected from the group consisting of labile hydrogen, heterocyclic ring, hydroxy, amino, cyano, and halogen polar groups.

11. The composition of claim 9 wherein the polymerizable acrylate ester monomer is a polyacrylate ester monomer of the formula

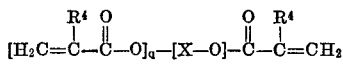

wherein $R^4$ is a radical selected from the group consisting of hydrogen, halogen and alkyl of from 1 to about 4 carbon atoms; $q$ is an integer equal to at least 1; and X is an organic radical containing at least two carbon atoms and having a total bonding capacity of $q$ plus 1.

12. The composition of claim 9 which additionally contains an accelerator of free radical polymerization selected from the group consisting of organic amines, organic imides, organic sulfimide and organic amides.

13. The composition of claim 12 wherein the accelerator is a mixture of an organic sulfimide and an organic amine of the formula

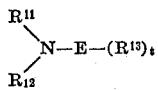

wherein E represents a carbocyclic aromatic nucleus selected from the group consisting of phenyl and naphthyl radicals; $R^{11}$ and $R^{12}$ are hydrocarbon groups containing up to about 10 carbon atoms; $t$ is one of the following: 0, integer equal to from 1 to 5 inclusive; $R^{13}$ is a hydrocarbon group containing up to about 5 carbon atoms, provided that when an $R^{13}$ radical is in the ortho position, $t$ is greater than 1.

14. The composition of claim 10 wherein the hydroperoxy polymerization initiator is an organic hydroperoxide comprising from about 0.1 to less than about 10 percent by weight of the composition, and the stable nitroxide free radical comprises from about 10 to about 1,000 parts per million by weight of the composition.

References Cited

UNITED STATES PATENTS 3,046,262   7/1962   Krieble ---------- 260—89.5 R

FOREIGN PATENTS 1,127,127   9/1968   Great Britain.

HARRY WONG, Jr, Primary Examiner

U.S. Cl. X.R.

117—128.4, 132, 161; 204—159.11; 260—78.4 N, 86.1 E, 88.3 A